US011113550B2

(12) United States Patent
Zeisler

(10) Patent No.: US 11,113,550 B2
(45) Date of Patent: Sep. 7, 2021

(54) METHOD AND DEVICE FOR REMINDING A DRIVER TO START AT A LIGHT SIGNAL DEVICE WITH VARIABLE OUTPUT FUNCTION

(71) Applicant: Bayerische Motoren Werke Aktiengesellschaft, Munich (DE)

(72) Inventor: Joeran Zeisler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 199 days.

(21) Appl. No.: 16/539,133

(22) Filed: Aug. 13, 2019

(65) Prior Publication Data

US 2019/0362166 A1    Nov. 28, 2019

Related U.S. Application Data

(63) Continuation of application No. PCT/EP2018/054702, filed on Feb. 26, 2018.

(30) Foreign Application Priority Data

Mar. 14, 2017  (DE) .................... 10 2017 204 256.7

(51) Int. Cl.
*G06K 9/00*     (2006.01)
*B60W 50/14*    (2020.01)
(Continued)

(52) U.S. Cl.
CPC ......... *G06K 9/00825* (2013.01); *B60W 50/14* (2013.01); *G08G 1/095* (2013.01);
(Continued)

(58) Field of Classification Search
CPC .............. G06K 9/00825; B60W 50/14; B60W 2050/146; G08G 1/095; G08G 1/09623; G08G 1/0968; G08G 1/0967
See application file for complete search history.

(56) References Cited

U.S. PATENT DOCUMENTS 6,629,515 B1   10/2003   Yamamoto et al.
6,820,709 B1   11/2004   Zimmermann et al.
(Continued)

FOREIGN PATENT DOCUMENTS

CN    1834577 A    9/2006
CN  103101539 A    5/2013
(Continued)

OTHER PUBLICATIONS

International Search Report (PCT/ISA/210) issued in PCT Application No. PCT/EP2018/054702 dated Jul. 27, 2018 with English translation (nine (9) pages).
(Continued)

*Primary Examiner* — Richard M Camby
(74) *Attorney, Agent, or Firm* — Crowell & Moring LLP

(57) ABSTRACT

A method for reminding a driver of a motor vehicle to start at a light signal device, includes the following steps: detecting a light signal of a light signal device by evaluating an image data set; detecting the stationary state of the motor vehicle according to the motor vehicle operating parameters; producing a stop signal when the detected light signal is a stop light signal and when the motor vehicle is stationary; in the presence of the stop signal, generating a start signal when a switch to a drive light signal is detected by evaluating an additional image data set, and transferring the start signal via an interface to an output device.

14 Claims, 6 Drawing Sheets

(51) Int. Cl.
*G08G 1/095* (2006.01)
*G08G 1/0962* (2006.01)
*G08G 1/0968* (2006.01)

(52) U.S. Cl.
CPC ....... *G08G 1/0968* (2013.01); *G08G 1/09623* (2013.01); *B60W 2050/146* (2013.01)

(56) References Cited

U.S. PATENT DOCUMENTS

| | | | |
|---|---|---|---|
| 9,922,559 B1 * | 3/2018 | Inoue | G08G 1/096783 |
| 2006/0207818 A1 | 9/2006 | Fujioka et al. | |
| 2009/0312888 A1 | 12/2009 | Sickert et al. | |
| 2010/0033571 A1 | 2/2010 | Fujita et al. | |
| 2013/0124071 A1 | 5/2013 | Engel | |
| 2013/0179023 A1 | 7/2013 | Schmidt | |
| 2014/0176321 A1 * | 6/2014 | Chen | B60W 30/14 340/435 |
| 2014/0222280 A1 | 8/2014 | Salomonsson et al. | |
| 2015/0154860 A1 * | 6/2015 | Holzwanger | G08G 1/0967 340/944 |
| 2015/0275840 A1 | 10/2015 | Sawada | |
| 2016/0016515 A1 | 1/2016 | Mangin | |
| 2016/0179195 A1 | 6/2016 | Motz et al. | |
| 2016/0217581 A1 * | 7/2016 | Su | G06T 7/254 |
| 2016/0318490 A1 | 11/2016 | Shalom | |
| 2017/0015198 A1 | 1/2017 | Suzuki | |
| 2017/0015327 A1 | 1/2017 | Henel et al. | |
| 2017/0060235 A1 | 3/2017 | Banyay et al. | |
| 2017/0154523 A1 * | 6/2017 | Moritani | G08G 1/07 |
| 2017/0155867 A1 | 6/2017 | Yokota et al. | |

FOREIGN PATENT DOCUMENTS

| | | | |
|---|---|---|---|
| CN | 103171439 A | 6/2013 | |
| CN | 104943690 A | 9/2015 | |
| CN | 105313780 A | 2/2016 | |
| CN | 105711511 A | 6/2016 | |
| CN | 205665896 U | 10/2016 | |
| CN | 106132753 A | 11/2016 | |
| CN | 106226910 A | 12/2016 | |
| CN | 106347368 A | 1/2017 | |
| CN | 106384525 A | 2/2017 | |
| CN | 106458029 A | 2/2017 | |
| CN | 106484094 A | 3/2017 | |
| DE | 199 58 520 A1 | 6/2001 | |
| DE | 10 2007 029 482 A1 | 1/2009 | |
| DE | 10 2008 010 968 A1 | 9/2009 | |
| DE | 10 2011 116 304 A1 | 4/2012 | |
| DE | 10 2013 203 653 A1 | 9/2014 | |
| DE | 10 2015 003 847 A1 | 8/2015 | |
| DE | 102015003847 A1 * | 8/2015 | G06K 9/00825 |
| DE | 10 2015 005 222 A1 | 12/2015 | |
| EP | 2 093 738 A2 | 8/2009 | |
| JP | 2010-123100 A | 6/2010 | |
| WO | WO 2009/000580 A1 | 12/2008 | |
| WO | WO 2015/055185 A1 | 4/2015 | |

OTHER PUBLICATIONS

German-language Written Opinion (PCT/ISA/237) issued in PCT Application No. PCT/EP2018/054702 dated Jul. 27, 2018 (10 pages).

German-language Search Report issued in counterpart German Application No. 10 2017 204 256.7 dated Nov. 30, 2017 with partial English translation (11 pages).

International Search Report (PCT/ISA/210) issued in PCT Application No. PCT/EP2018/054701 dated Jun. 8, 2018 with English translation (seven (7) pages).

German-language Written Opinion (PCT/ISA/237) issued in PCT Application No. PCT/EP2018/054701 dated Jun. 8, 2018 (eight (8) pages).

German-language Search Report issued in German Application No. 10 2017 204 254.0 dated Nov. 30, 2017 with partial English translation (12 pages).

Chinese-language Office Action issued in Chinese Application No. 201880005457.8 dated Apr. 27, 2021 with English language translation (21 pages).

* cited by examiner

METHOD AND DEVICE FOR REMINDING A DRIVER TO START AT A LIGHT SIGNAL DEVICE WITH VARIABLE OUTPUT FUNCTION

CROSS REFERENCE TO RELATED APPLICATIONS

This application is a continuation of PCT International Application No. PCT/EP2018/054702, filed Feb. 26, 2018, which claims priority under 35 U.S.C. § 119 from German Patent Application No. 10 2017 204 256.7, filed Mar. 14, 2017, the entire disclosures of which are herein expressly incorporated by reference.

BACKGROUND AND SUMMARY OF THE INVENTION

The invention relates generally to motor vehicles, in particular motor vehicles having apparatuses designed to remind a driver to start at a light signal device allowing onward travel. Furthermore, the invention relates to methods for reminding about starting at a light signal device.

A set of traffic lights (light signal device) is understood to mean a signal generator of a light signal installation (LSA) used to control road traffic. Traffic lights dictate a particular behavior for road users by delivering controlled signals. These road signs or light signals, which are of different type according to shape and color, each have a different meaning and are effective only contrary to the direction of travel of the traffic to be controlled.

DE 10 2011 116304 A1 discloses a motor vehicle having a driver assistance system that has an image processing device, wherein the image processing device detects light signals of a light signal device of a light sign installation and, subsequently, a further function is performed, the further function comprising at least one of the following: reminder to start, engine start, symbols display of a state of the light sign installation, cross fade between a mirror image in the mirror and an image of the light sign installation, and brightening or switching on the image display device. However, the driver is provided with no information about the reliability of the detection process of the light signals.

This can then lead to an unsuccessful detection process for the light signals resulting in there being no reminder process, but the driver being reliant on the apparatus that is then not working correctly and not paying attention to a signal change, which leads to an unnecessary standstill at a light signal device allowing the onward travel.

It is thus an object of the present invention to provide a method by which unnecessary standstill times at a light signal device allowing the onward travel can be decreased.

This object is achieved by a method for reminding a driver of a motor vehicle to start at a light signal device and by an apparatus performing the method, a motor vehicle having such an apparatus, a computer program and a computer program product, in accordance with embodiments of the invention.

According to a first aspect, there is provision for a method for reminding a driver of a motor vehicle to start at a light signal device, having the steps of:
 detecting a light signal of a light signal device, in particular by evaluating an image data record,
 generating a stop signal when a stop light signal is detected as the light signal while the motor vehicle is at a standstill,
 when the stop signal is present, generating a start signal when the light signal is detected as changing over to a drive light signal, in particular by evaluating a further image data record, and
 transmitting the start signal to an output appliance via an interface.

An image data record can be detected using a camera of the motor vehicle that e.g. also provides image data for other driver assistance systems. It is possible for the motor vehicle to be at a standstill after the motor vehicle has been stopped by the driver in front of a light signal device prohibiting onward travel e.g. as a result of evaluation of motor vehicle operating parameters, such as e.g. odometer data or wheel speed sensors.

The image data record is evaluated to determine which of the light signal devices is relevant to the motor vehicle, i.e. whether it is a light signal device for motor vehicles or for cyclists. Additionally, it is determined which of a plurality of light signal devices is relevant to the motor vehicle, e.g. when a junction has provision for multiple light signal devices for different lanes. In addition, the image data record is evaluated to determine whether a current light signal of the light signal device prohibits onward travel. This can be a red traffic light, i.e. the red—and usually topmost—lamp in the set of traffic lights is activated. Additionally, there may also be provision for a light signal to be regarded as a light signal prohibiting onward travel if the amber—and usually middle—lamp in the set of traffic lights is activated.

If the light signal device prohibits onward travel, that is to say that a stop light signal is present and the motor vehicle is at a standstill, a stop signal is generated and brought to the attention of the driver. This can be an audible signal and/or a visual signal, the visual signal e.g. being able to be projected into the windshield by means of a headup display or displayed on another display device.

Further, presence of the stop signal prompts a start signal to be generated when a drive light signal has been detected by evaluating a further image data record. The drive light signal can be a green traffic light, i.e. the green—and usually bottommost—lamp in the light signal device is activated. Alternatively, there may also be provision for all the lamps in the light signal device going out to be rated as a drive light signal. This is the case e.g. with light signal devices having only two lamps, e.g. red and amber, i.e. in the case of what are known as pedestrian-operated traffic lights. In that case, the display of a green traffic light in the display of the driver would be inappropriate and misleading because a pedestrian-operated set of traffic lights going out does not lead to travel being allowed unreservedly as in the case of a green traffic light. Rather, the junction is therefore downgraded to the next valid control level. However, the driver can be reminded that the traffic lights have gone out, but a distinction from a green traffic light is needed.

The output appliance may be installed in the motor vehicle, i.e. it is an integral part of the motor vehicle. Such a display device can be e.g. a display. Further display devices can be e.g. smart glasses, other actuatable output appliances and portable output appliances, in particular mobile devices. A portable output appliances is understood to mean an output appliances that is in the form of a handheld unit. A handheld unit or handheld device is understood to mean a portable electronic device supplied with power by means of rechargeable batteries or batteries for different applications. Such a handheld unit may be e.g. a smartphone or a tablet. In this case, a smartphone is understood to mean a cellphone that provides considerably more extensive computer functionality and connectivity than a conventional "pure" cellphone. A central feature of modern smartphones are touchscreens or touch-sensitive screens. An important feature is also that internet download portals can be used in a simple manner to install supplementary programs, which now exist for a wide variety of applications. A tablet or tablet computer, tablet PC, more rarely also flat computer, is understood to mean a portable flat computer in a particularly lightweight version having a touchscreen. The lightweight design and the touch sensitive screen mean that tablets are distinguished by easy handling. The devices are similar in capability, operation and design to smartphones and for the most part use operating systems originally developed for smartphones. The scope of functions of a tablet can also be extended by supplementary programs (called apps). The output appliance can then be used to output the start signal, e.g. by inserting start symbols into a reproduction or display on a display, in particular when the driver has directed his attention to the portable output appliance in order to use another function of the portable output appliance.

According to one embodiment, the interface is designed for wireless data transmission. This can be accomplished by using e.g. a Bluetooth connection. A wired connection is therefore is not made.

According to one embodiment, a line of vision of a driver of the motor vehicle and a position of the output appliance are detected and evaluated, and the start signal is transmitted to the output appliance only if the output appliance is at a position in the line of vision of the driver. This is accomplished by evaluating image data of an interior camera of the motor vehicle in order to determine the line of vision of the driver and the position of the portable output appliance. Instead of image data of an interior camera, the line of vision of the driver can be determined in another way, e.g. on the basis of an interaction between the driver and the output appliance. This ensures that the start signal is transmitted to the output appliance only if the output appliance is in the line of vision of the driver and the driver can also see a visual start signal. If, on the other hand, the result of the evaluation means that the driver is holding the output appliance in his hand or the output appliance is in bodily contact with the driver in another way, the output appliance can be actuated such that it generates a haptic start signal, such as a vibration alarm.

According to one embodiment, an orientation of the output appliance is furthermore detected and evaluated, and the detected orientation is taken as a basis for generating a start signal that stimulates the vision or another sense of the driver. The detecting and evaluating of the orientation detects whether the driver is actually viewing a display page of the output appliance or the back of the output appliance. If it is found that the driver is viewing the display page, a visual start signal is generated, whereas a haptic start signal, such as a vibration alarm, is generated if the driver is viewing the back.

According to one embodiment, the presence of the stop signal is taken as a basis for evaluating further data in order to determine a confidence value for a reference, and a confirmation signal is generated if the result of a comparison is that the confidence value is greater than a predetermined threshold value. Thus, presence of the stop signal additionally prompts further data to be captured and evaluated in order to determine a confidence value for the reference. The confidence value is a measure of the degree of certainty with which the light signal device relevant to the motor vehicle has been detected. In this regard, the confidence value is compared with a threshold value, and a confirmation signal is generated if the result of the comparison is that the confidence value is greater than the predetermined threshold value. The confirmation signal is also brought to the attention of the driver. The confirmation signal can be an audible signal and/or a visual signal, wherein the visual signal e.g. can be projected into the windshield by means of a headup display or displayed on another display device. Therefore, the driver is provided with information from which he can tell that the selected light signal device is the "correct" light signal device for the motor vehicle and he can assume that he will be reminded to travel onward when travel is allowed by the selected light signal device.

According to one embodiment, a further start signal is generated if starting of the motor vehicle has not been detected after a period of time has elapsed. There is therefore provision for a renewed or repeated reminder for the driver, reducing unnecessary standstill times.

According to a further aspect, an apparatus for reminding a driver of a motor vehicle to start at a light signal device is produced, wherein the apparatus is designed to detect light signals of a light signal device by evaluating an image data record, to generate a stop signal when a stop light signal is detected while the motor vehicle is at a standstill, when the stop signal is present, to generate a start signal when the light signal is detected as changing over to a drive light signal by evaluating a further image data record, and in order to transmit the start signal to an output appliance via an interface. The apparatus may be, for example, a computer implemented apparatus.

According to a further aspect, a motor vehicle has such an apparatus.

According to a further aspect, there is provision for a computer program having program code means in order to perform all the steps of one of the specified methods when the computer program is executed on a computer or one of the specified apparatuses.

According to a further aspect, there is provision for a computer program product containing a program code that is stored on a computer-readable data storage medium and that, when executed on a data processing device, performs one of the specified methods.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
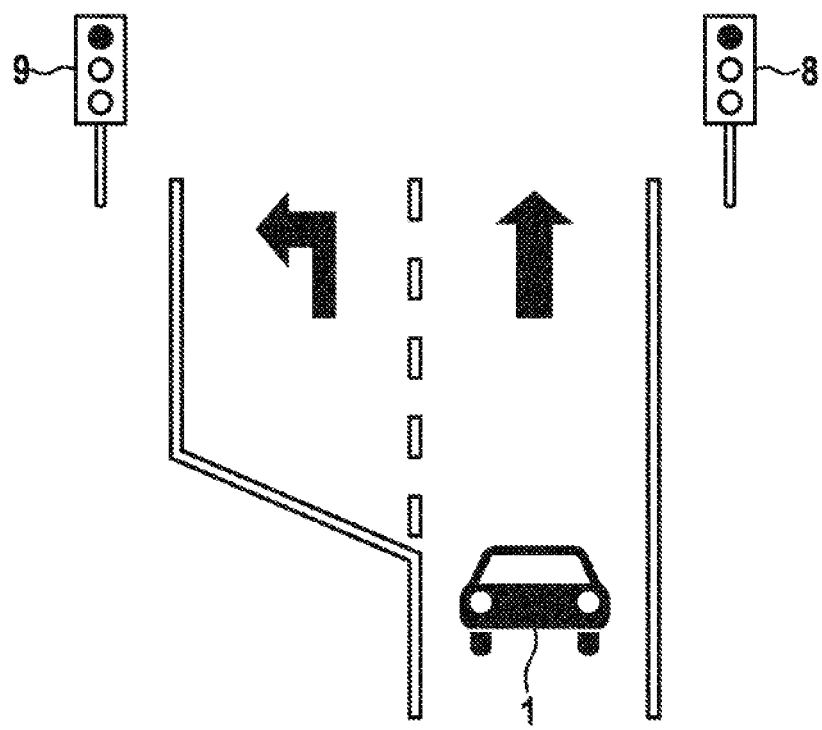
FIG. 1 shows a traffic scenario in which a driver of a motor vehicle is reminded to travel onward.

FIG. 1 schematically shows a motor vehicle 1, which is in the form of a passenger vehicle in the present exemplary embodiment. In the traffic scenario depicted in FIG. 1, the motor vehicle 1 is approaching a traffic-light-controlled junction, with the lane dividing into two lanes. A first lane is intended for driving straight on and possibly vehicles turning right, while a second lane is intended for vehicles turning left.

The first lane has an associated first light signal device 8 and the second lane has an associated second light signal device 9.

In the present exemplary embodiment, the motor vehicle 1 has an assistance system designed to detect light signals of the two light signal devices 8, 9 and to establish that one of the two light signal devices 8, 9, in the present exemplary embodiment the light signal device 9 associated with the second lane, is relevant to the planned onward travel of the motor vehicle 1 by turning left, i.e. the motor vehicle 1 can travel only on the basis of the light signals of the relevant light signal device 9.

A stop light signal, i.e. a light signal prohibiting the onward travel, changing to a drive light signal of the relevant light signal device 9, i.e. a light signal allowing the onward travel, prompts a drive reminder signal to be generated in order to remind the driver to travel onward. However, there is the possibility of the respective light signal device 8, 9 for the correct lane not being selected, e.g. on account of image data material of poor quality, or because when there are a large number of light signal devices, such as e.g. traffic lights for motor vehicle traffic and cyclists and also local public transport, explicit selection of the light signal devices 8, 9 is not possible. In such a case, the reminder process by generating the start signal is not performed, which can lead to an unnecessary standstill at a light signal device allowing the onward travel.

Thus, the motor vehicle 1 in the present exemplary embodiment has an apparatus 3 for reminding a driver of a motor vehicle to start at a light signal device, which is now explained with reference to FIG. 2.

Figure 2:
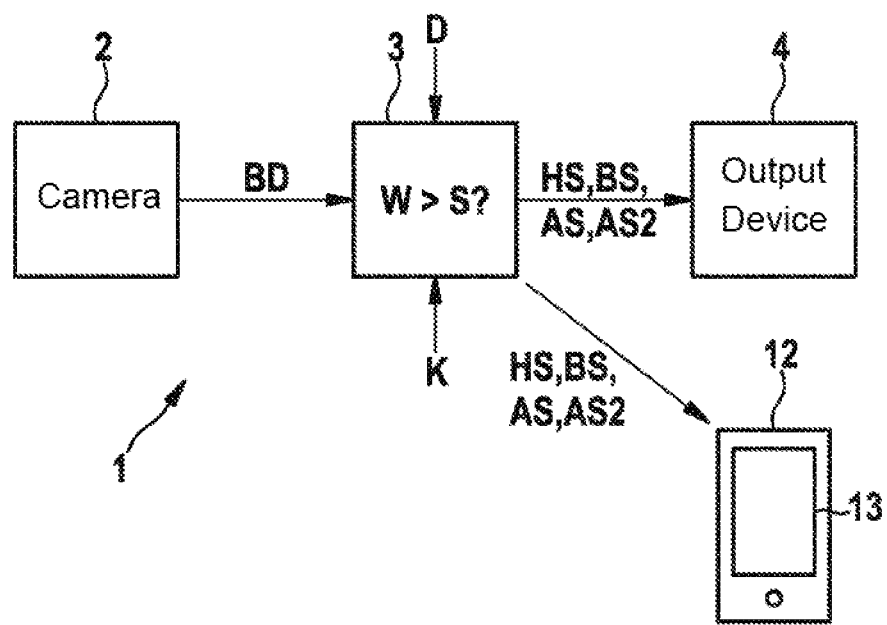
FIG. 2 shows a schematic depiction of an apparatus for reminding a driver of a motor vehicle to start at a light signal device.

FIG. 2 depicts a camera 2, the apparatus 3 for reminding a driver of the motor vehicle 1 to start at the relevant light signal device 9 and an output device 4.

The camera 2 is designed to provide an image data record BD of one or more light signal devices 8, 9 and to transmit it to the apparatus 3.

The apparatus 3 is further designed to read in motor vehicle operating parameters K of the motor vehicle 1, such as e.g. odometer data or wheel speed sensor data, and to determine that the motor vehicle 1 is at a standstill by evaluating the motor vehicle parameters K.

Further, the apparatus 3 is designed to determine a selection of the detected light signal for the motor vehicle 1, i.e. to determine whether the respective light signal device 8, 9 for the motor vehicle 1 provides light signals preventing onward travel. In addition, the apparatus 3 is designed to determine whether the detected light signal is a stop light signal.

The apparatus 3 generates a stop signal HS when a stop light signal and the circumstance of the motor vehicle 1 being at a standstill have been detected. The stop signal HS is transmitted to the output device 4.

Figure 4:
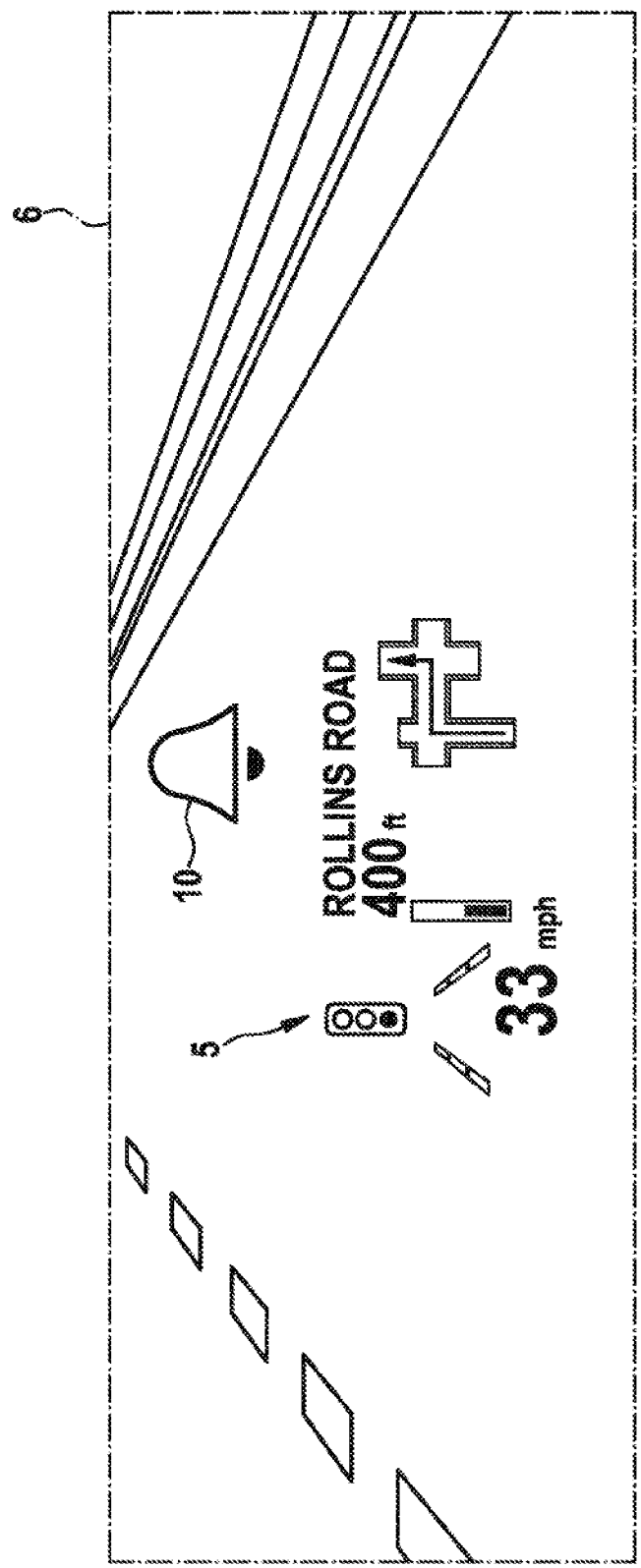
FIG. 4 shows a schematic depiction of a projection, produced by means of a headup display, on the windshield of the motor vehicle.

The output device 4 is designed to respond to reception of the stop signal HS by outputting an audible signal and/or a visual signal. In the present exemplary embodiment, a visual signal is e.g. projected into the windshield 6 in the form of a traffic light symbol 5 by means of a headup display (see FIG. 4) or displayed on another display device, such as e.g. a combination instrument 7 (see FIG. 5).

The traffic light symbol 5 may in this case be designed such that, when a stop light signal is present, said traffic light symbol has a light signal device prohibiting the onward travel (red traffic light), i.e. the red—and usually topmost—lamp in the traffic light symbol 5 is depicted in lit fashion, whereas e.g. when a drive light signal is present it has a light signal device allowing the onward travel (green traffic light), i.e. the green—and usually bottommost—lamp in the traffic light symbol 5 is depicted in lit fashion. Further, the form and type of presentation can change, e.g. the light signal 5 can pulsate or have a changing brightness in the case of a green traffic light.

Further, the apparatus 3 is designed to capture and evaluate further operating variables D in order to determine a confidence value W. The confidence value W is a measure of the degree of certainty with which the light signal device 9 relevant to the motor vehicle 1 has been detected.

This is accomplished by evaluating operating variables D of the motor vehicle 1 that are transmitted between various controllers of the motor vehicle 1, e.g. via a CAN bus. In the present exemplary embodiment, the operating variables D comprise a state of a direction of travel indicator of the motor vehicle 1, i.e. whether said direction of travel indicator has been activated by the driver.

Additionally or alternatively, the operating variables D can be provided by a navigation appliance. It is then evident from the operating variables D which lane the motor vehicle 1 is in. Since different lanes at e.g. junctions are associated with different directions, such as e.g. right and left turn lane, it is possible to determine that the motor vehicle 1 is in a left turn lane. This can be accomplished by using consolidated data from a navigation appliance and a localization derived from a capture of surroundings, e.g. by means of detection of ground markings.

In addition, there may additionally or alternatively be provision for the operating variables D to contain information about the direction in which the journey is continued according to the route determined by the navigation appliance. In this case, the navigation appliance is thus active, i.e. the driver has prescribed a destination at the beginning of the journey and the navigation appliance has calculated a route to get to this destination. Accordingly, it is possible to establish that, according to this route, there is now provision for turning left in order to get to the destination.

Further, there may additionally or alternatively be provision for external variables to be evaluated as an operating variable. As such, data e.g. from a cloud or other traffic guidance and/or control devices can be used and evaluated that contain e.g. information about the respective traffic light phases.

The apparatus 3 may be designed to compare the determined confidence value W with a predetermined threshold value S. If the result of the comparison is that the confidence value W is greater than the predetermined threshold value S, the apparatus 3 generates a confirmation signal BS that is also transmitted to the output device 4.

Figure 3:
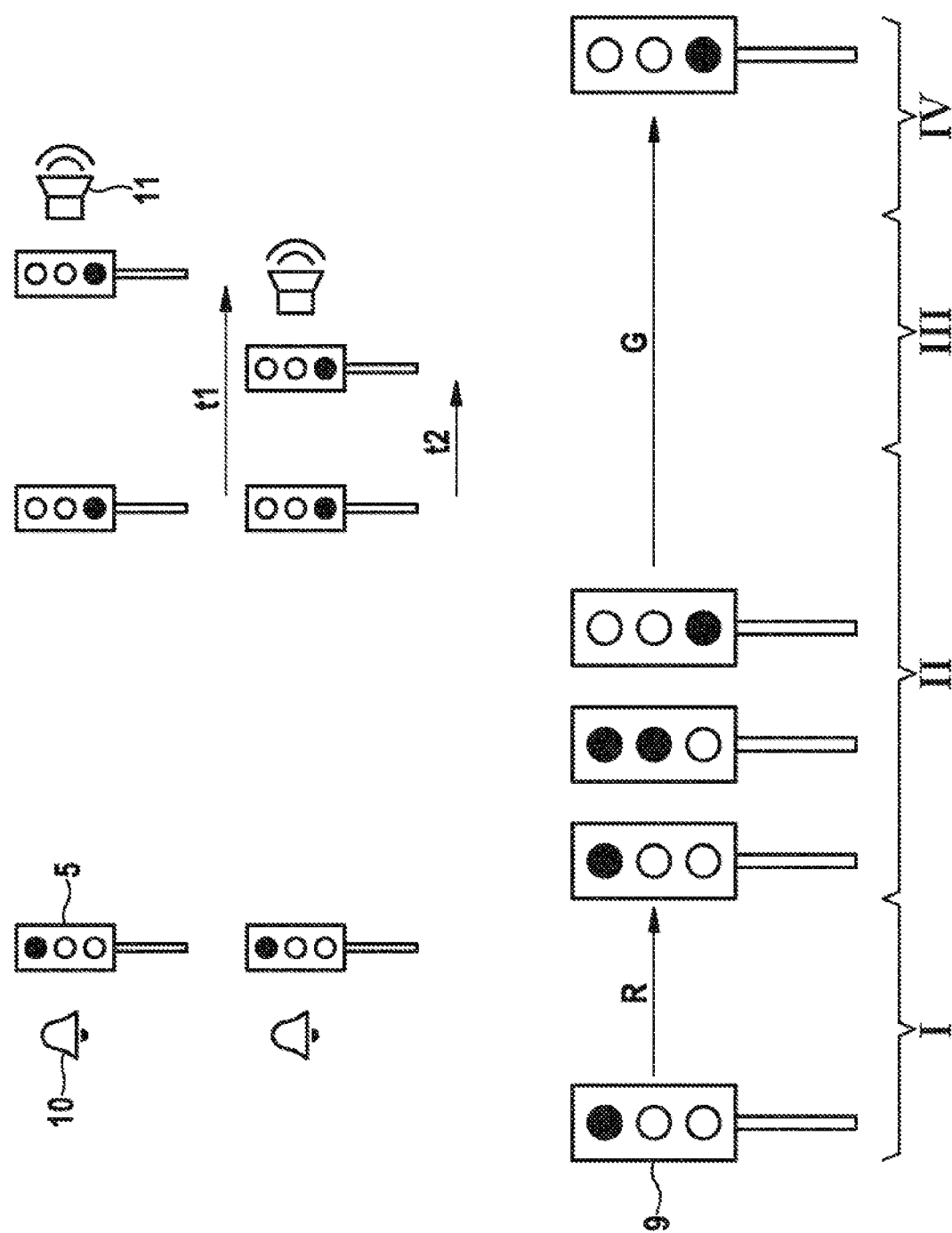
FIG. 3 shows an operating scheme.
Figure 5:
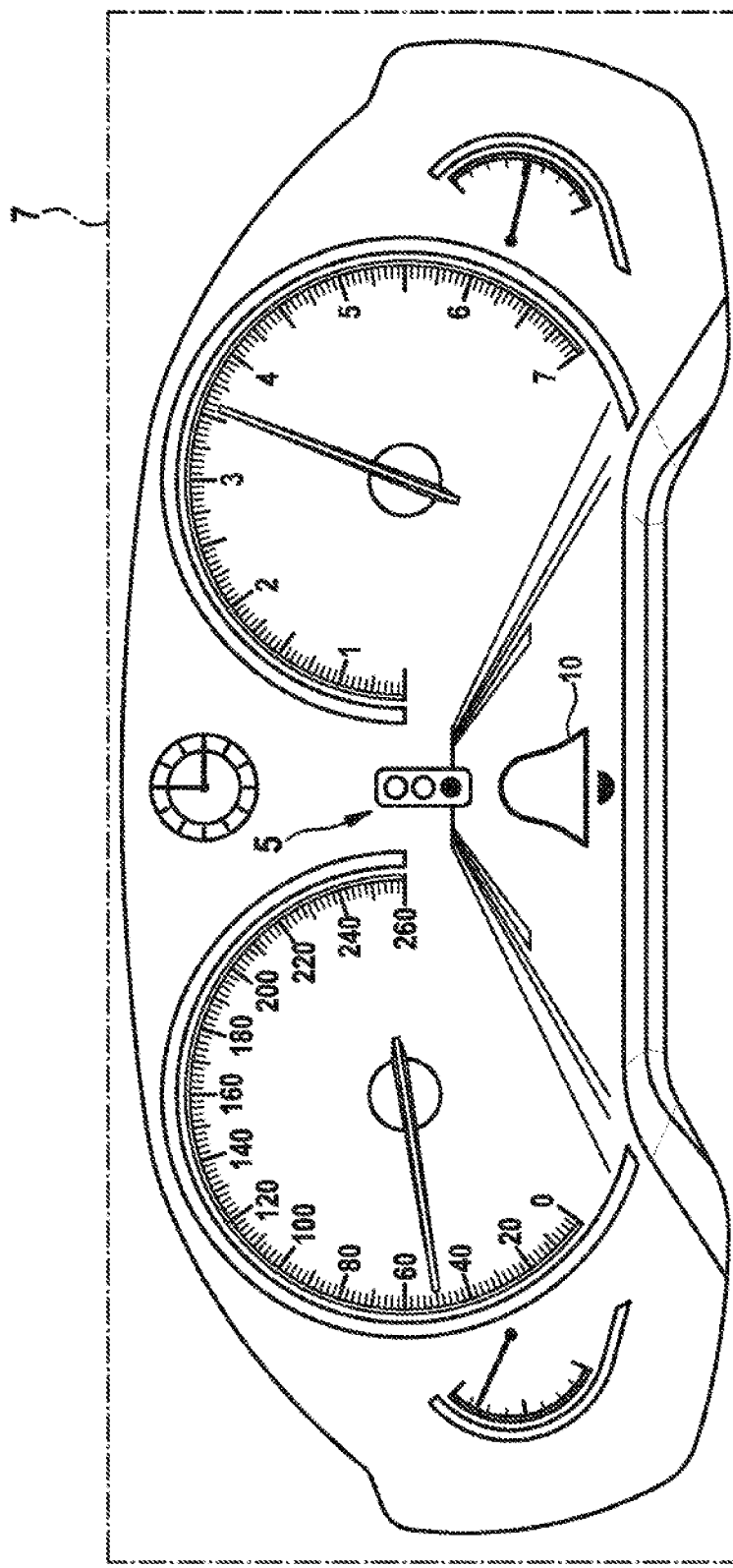
FIG. 5 shows a schematic depiction of a section of a dashboard of the motor vehicle.

The output device 4 is designed to respond to reception of the confirmation signal BS by outputting a further audible signal and/or visual signal that e.g. is projected into the windshield 6 in the form of a bell symbol 10 (see FIG. 3) by means of the headup display or displayed on another display device, such as the combination instruction 7 (see FIG. 5).

The apparatus 3 is further designed to generate a start signal AS when the result of an evaluation of a subsequently obtained image data record BD is that a drive light signal, such as e.g. a green traffic light, is now present.

Finally, the apparatus 3 may be designed so that the generating of the start signal AS is terminated when a detected drive light signal prompts the motor vehicle 1 to be found to be starting, e.g. by evaluating the motor vehicle operating parameters K.

In addition, in the present exemplary embodiment, the apparatus 3 is designed to generate a further start signal AS2 when starting of the motor vehicle 1 has not been detected after a period of time t1 has elapsed. In this case, in the present exemplary embodiment, the start signal AS and the further start signal AS2 can stimulate different senses of the driver. In the present exemplary embodiment, the first start signal AS, as a visual signal, stimulates the vision of the driver, whereas the second start signal AS2, as an audible signal, stimulates the hearing of the driver. As a departure from the present exemplary embodiment, it is possible e.g. for the second start signal AS2, as a haptic signal, to stimulate the sense of touch of the driver.

Further, in the present exemplary embodiment, the apparatus 3 is designed to suppress the generating of at least one start signal AS, AS2 when the detecting of a drive light signal prompts a road user to be detected that is situated and at a standstill in front of the motor vehicle in the direction of travel of the motor vehicle. This can be accomplished by virtue of the image data record BD being evaluated by the apparatus 3 in an appropriate manner.

The apparatus 3 may be designed to generate the first start signal AS in direct response to a detected drive light signal. Further, the apparatus 3 is designed to generate the second start signal AS2 with a time delay after the first start signal AS.

In this case, a period of time t1 between the generating of the first start signal AS and of the second start signal AS2 can be adapted on the basis of a captured parameter.

The parameter can indicate a visibility of the light signal device 9 by the driver, an attentiveness of the driver, an availability of the motor vehicle 1, a traffic flow dynamic, a traffic density and/or a type of surroundings or may be freely parameterizable by the driver.

For example, evaluating the image data record BD can establish whether or not the driver can perceive a change of light sign of the light signal device 9 without difficulty. If there is no visibility of the light signal device 9, the period of time can be reduced by a predetermined value or factor.

An interior camera can be used to detect the attentiveness of the driver. For example, the direction in which the driver is currently looking is detected, or whether he has closed his eyes. Detected reduced attentiveness can prompt the further period of time t2 for the further start signal AS2 is generated to be reduced to zero. At the same time, generation of the first start signal AS can cease.

Availability is understood to mean fast or slow activability of the drive engine of the motor vehicle 1. For example, there is fast activability when an internal combustion engine has been started by a start/stop system or the start/stop system is active in order to start the internal combustion engine. In such a case, the period of time t1 can be reduced.

Traffic flow dynamic is understood to mean how quickly a vehicle in front starts moving in response to a drive light signal. In this regard, the image data record BD is evaluated in order to detect what period of time elapses from a change to a drive light signal to the vehicle in front starting. A short period of time indicates a high traffic flow dynamic as in urban areas, while a long period of time indicates a low traffic flow dynamic as in rural areas. The period of time t1 can be reduced for a high traffic flow dynamic, whereas the period of time t1 can be increased for a low traffic flow dynamic.

The traffic density can be determined by evaluating the image data record BD, e.g. by determining the number of road users situated in the surroundings of the motor vehicle 1. A large number of road users is regarded as indicative of a high traffic density, whereas a small number of road users is regarded as indicative of a low traffic density. The period of time t1 can be reduced for a high traffic density, whereas the period of time t1 can be increased for a low traffic density.

The type of surroundings indicates whether the motor vehicle 1 is currently moving in urban or rural surroundings. In this regard, data of a navigation appliance of the motor vehicle 1 are evaluated. The period of time t1 can be reduced in an urban area, whereas the period of time t1 can be increased in a rural area.

Additionally, in the present exemplary embodiment, the apparatus 3 is designed to use an interface designed for wireless data transmission to transmit the stop signal HS, the confirmation signal BS, the start signal AS and the further start signal AS2.

Further, the apparatus 3 is designed to evaluate image data of an interior camera of the motor vehicle 1 in order to determine a line of vision of a driver of the motor vehicle 1 and a position of a mobile portable output appliance 12 and also an orientation of the mobile output appliance 12. As a departure from the present exemplary embodiment, the apparatus 3 may also be designed to determine a line of vision of the driver to a permanently installed output appliance, such as e.g. a display.

The apparatus 3 transmits the stop signal HS, the confirmation signal BS, the start signal AS and the further start signal AS2 to the portable output appliance 12 only if the portable output appliance 12 is in the line of vision of the driver and e.g. can also perceive the start signal AS in visual form. If, on the other hand, the result of the evaluation is that the driver is admittedly holding the portable output appliance 12 e.g. in his hand, the portable output appliance 12 can be actuated such that it e.g. generates the start signal AS in haptic form, e.g. by means of a vibration alarm of the portable output appliance 12. In visual form, the start signal AS can be reproduced on a screen 13 of the portable output appliance 12 in the form of an insertion of a symbol.

If the driver is holding the portable output appliance 12 such that he cannot see the screen 13, i.e. is viewing the opposite side from the screen 13, this detected orientation can be taken as a basis for actuating a portable output appliance 12 such that the start signal AS is generated in haptic form e.g. by means of a vibration alarm of the portable output appliance 12.

During operation (see FIG. 3), the motor vehicle 1 approaches a light signal device 9 prohibiting further travel during a first phase I.

Image data records BD are continuously transmitted from the camera 2 to the apparatus 3 and evaluated. As soon as the motor vehicle 1 is within a minimum distance of the light signal device 9, e.g. 40 m, the image data records BD can be evaluated in order to detect the current light signal.

The first phase I ends and the second phase II begins when the result of an evaluation of the motor vehicle operating parameters K by the apparatus 3 is that the motor vehicle 1 is at a standstill.

Figure 6:
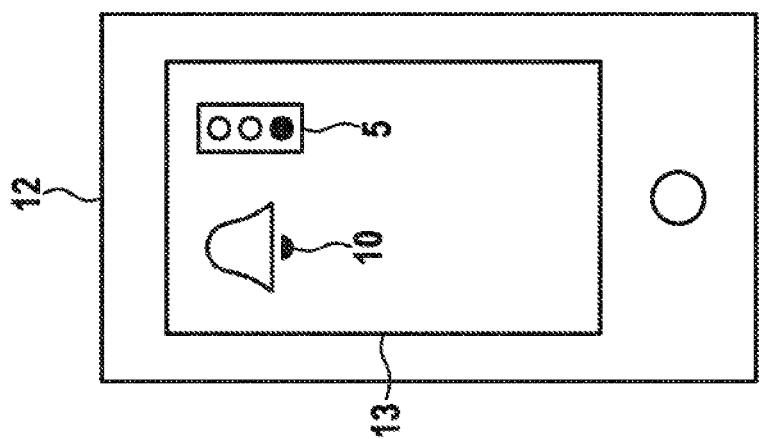
FIG. 6 shows a schematic depiction of a mobile output appliance.

Since the detected light signal relates to the motor vehicle 1 and is a stop light signal, the apparatus 3 now generates the stop signal HS during the second phase II, whereupon the output device 4 in the present exemplary embodiment then projects a visual signal into the windshield 6 in the form of a traffic light symbol 5 (symbolizing a red traffic light) by means of the headup display (see FIG. 4) or displays it on another display device, such as e.g. the combination instrument 7 (see FIG. 5). If, on the other hand, the stop signal HS is transmitted to the mobile output appliance 12, the traffic light symbol 5 is displayed on the screen 13 of the mobile output appliance 12 (see FIG. 6).

Further, during the second phase II, the apparatus 3 captures and evaluates the further operating variables D in order to compare the confidence value W with the threshold value S. If the result of the comparison is that the confidence value W is greater than the predetermined threshold value S, the apparatus 3 also can now reach the confirmation signal BS during the second phase II. Thereupon, the output device 4 in the present exemplary embodiment projects a visual signal into the windshield 6 in the form of a bell symbol 10 by means of the headup display or outputs said signal using a display device, such as e.g. the combination instrument 7. Alternatively, the confirmation signal BS is transmitted to the mobile output appliance 12, where it is displayed on the screen 13.

During the second phase II, the red phase R of the light signal device ends and, after a transition phase with the red and amber lamps of the light signal device 9 active at the same time, a green phase G of the light signal device 9 begins. Further, the bell symbol 10 goes out in the present exemplary embodiment.

If the result of an evaluation of a further image data record BD is that the light signal device has changed to green in the meantime, that is to say that a drive light signal of the light signal device is present, the apparatus 3 generates the start signal AS. This is accomplished by now e.g. modifying the traffic light symbol 5 (a green traffic light is symbolized or displayed).

The second phase II ends and the third phase III begins when the apparatus 3 detects, by evaluating the motor vehicle operating parameters K, that the driver has initiated a start process. Thereupon, the generating of the start signal AS is terminated, i.e. the traffic light symbol 5 goes out.

If starting does not take place, however, the further start signal AS2 is additionally generated, such as in the form of an audible reminder 11, after the period of time t1 has elapsed. If evaluating the motor vehicle operating parameters K detects that the driver has now initiated a start process, the generating of the first start signal AS and of the second start signal AS2 is terminated, i.e. the traffic light symbol 5 and the audible reminder 11 disappear (see phase IV).

If, however, there is a vehicle in front at the light signal device 9 in front of the motor vehicle 1 and said vehicle in front starts moving only after a period of time has elapsed, and is then no longer an obstacle for onward travel of the motor vehicle 1, there is a wait for a further period of time t2 to elapse until the start signal AS and the further start signal AS2 are generated and output. Alternatively, the period of time t1 can also be set in motion with a time delay, the trigger being the detected starting of the vehicle in front.

If, on the other hand, the motor vehicle 1 is approaching a traffic-light-controlled junction (see FIG. 1), the motor vehicle 1 is initially in an area having only a single carriageway. In this case, the driver has also not yet operated the direction of travel indicator. Consequently, the result of the determination of the confidence value W is a magnitude that is less than the threshold value S, and a confirmation signal BS is not generated.

If the motor vehicle 1 continues to drive forward in the direction of the light signal device, there is a change to the left turn lane and at the same time the driver activates the direction of travel indicator. As a result, the magnitude of the confidence value W increases such that it now exceeds the threshold value S. A confirmation signal BS is then output.

Figure 7:
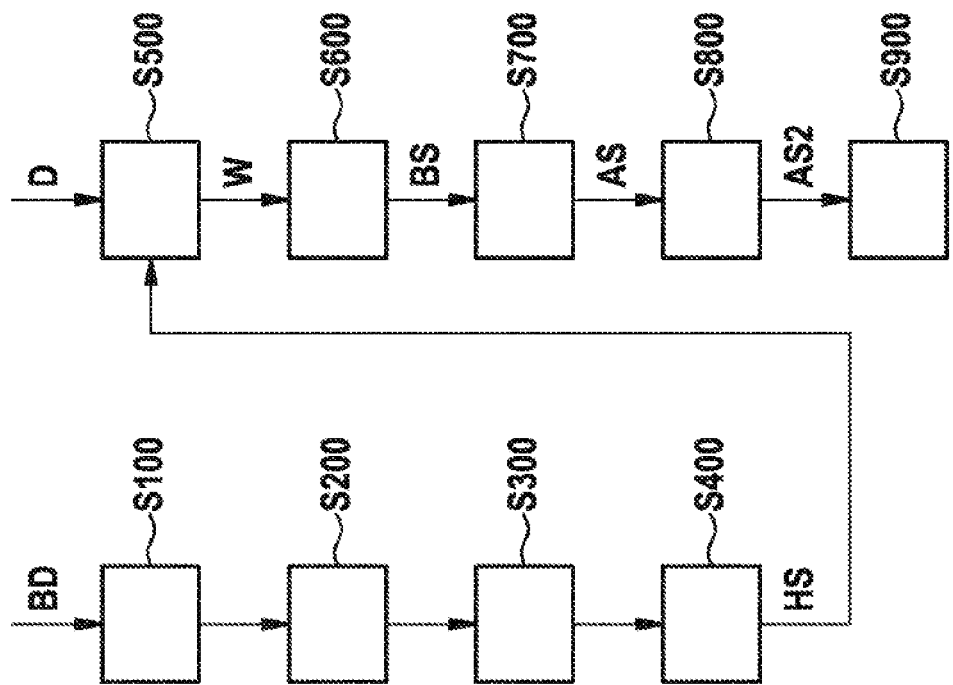
FIG. 7 shows a schematic depiction of a method sequence.

A method sequence for the operation of the apparatus 3 is now explained with reference to FIG. 7.

In a first step S100, light signals of a light signal device are detected by evaluating the image data record BD.

In a further step S200, the motor vehicle 1 is detected as being at a standstill by evaluating motor vehicle operating parameters K.

In a further step S300, the light signals are evaluated in order to select a detected light signal for the motor vehicle 1 and to determine whether the detected light signal is a stop light signal, such as e.g. a red traffic light.

In the further step S400, the stop signal HS is generated when a stop light signal and/or at the same time the circumstance of the motor vehicle being at a standstill has/have been detected.

In a further step S500, presence of the stop signal HS prompts the further operating variables D to be captured and evaluated in order to determine the confidence value W for the selected light signal.

In a further step S600, the confirmation signal BS is generated if the result of a comparison is that the confidence value W is greater than a predetermined threshold value S. Further, the confirmation signal BS is output in order to inform the driver about a verified selection.

In a further step S700, the start signal AS is generated when a drive light signal has been detected by evaluating a further image data record BD.

In a further step S800, after the period of time t1 has elapsed, the further start signal AS2 is generated if the motor vehicle 1 has not been detected as starting after the period of time t1 has elapsed. If a vehicle in front at the light signal device 9 in front of the motor vehicle 1 has been detected and it has started moving, the start signal AS and the further start signal AS2 are generated and output after the further period of time t2 has elapsed.

In a step S900, the generating of the first start signal AS and, if appropriate, of the second start signal AS2 and also of the confirmation signal BS is terminated if a detected drive light signal has prompted the motor vehicle 1 to be detected as starting.

As a departure from the present exemplary embodiment, the order of the steps may also be different. As such, the order of individual steps may be swapped, such as e.g. steps S100 and S200, or two or more steps can also be carried out at the same time or simultaneously.

Figure 8:
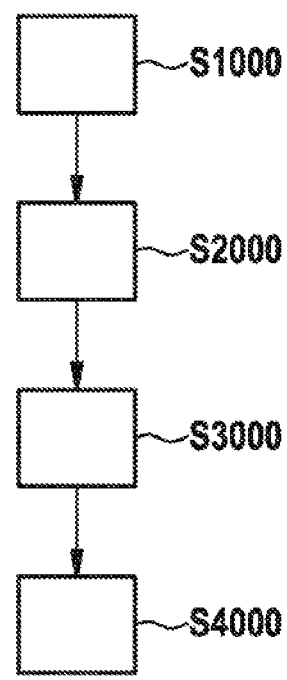
FIG. 8 shows a schematic depiction of a further method sequence.

Operation of the apparatus 3 together with the mobile output appliance 12 is now explained with reference to FIG. 8.

In a step S1000, the apparatus 3 checks whether a data transmission to the mobile output appliance 12 is possible.

If this is the case, image data of an interior camera of the motor vehicle 1 are evaluated in a step S2000 in order to determine the line of vision of the driver, the position of the mobile output appliance 12 and the orientation of the mobile output appliance 12.

If it is established that the mobile output appliance 12 is in the line of vision of the driver and is oriented such that the driver is looking at the screen 13 of the mobile output appliance 13, either the stop signal HS, the confirmation signal BS, the start signal AS and/or the further start signal AS2 are transmitted to the output appliance 12 and output in visual form on the screen 13 in a step S3000—depending on the current status.

Besides an interior camera, information of the output appliance 12 itself can also be used to check a possible interaction therewith. This can be accomplished by virtue of the output appliance 12 providing such a function, or said function is performed by means of coupling to the motor vehicle and the evaluation by the latter.

If, on the other hand, the result of the evaluation is that the driver is holding the mobile output appliance 12 in his hand or the mobile output appliance is in bodily contact with the driver in another manner, the mobile output appliance 12 is actuated in a step S4000 such that the stop signal HS, the confirmation signal BS, the start signal AS and/or the further start signal AS2 are output in haptic form by means of e.g. a vibration alarm.

Similarly, the stop signal HS, the confirmation signal BS, the start signal AS and/or the further start signal AS2 can be output in haptic form by means of e.g. a vibration alarm if the result of the detecting and evaluating of the orientation is that the driver is viewing the back of the mobile output appliance 12.

The method explained with reference to FIG. 8 can be performed periodically, e.g. either in fixed intervals or before output of one of the stop signal HS, the confirmation signal BS, the start signal AS and/or the further start signal AS2, i.e. before one of steps S400, S600, S700 and/or S800 (see FIG. 7).

LIST OF REFERENCE SIGNS

1 Motor vehicle
2 Camera
3 Apparatus
4 Output device
5 Traffic symbol
6 Windshield
7 Combination instrument
8 Light signal device
9 Light signal device
10 Bell symbol
11 Audible reminder
12 Output appliance
13 Screen The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for reminding a driver of a motor vehicle to start at a light signal device, the method comprising the acts of:
   detecting a light signal of a light signal device;
   generating a stop signal when a stop light signal is detected as the light signal while the motor vehicle is at a standstill;
   when the stop signal is present, generating a start signal when the light signal is detected as changing over to a drive light signal; and
   transmitting the start signal to an output appliance via an interface, wherein
   a line of vision of a driver of the motor vehicle and a position of the output appliance are detected and evaluated, and
   the start signal is transmitted to the output appliance only if the output appliance is at a position in the line of vision of the driver.

2. The method according to claim 1, wherein the interface is configured for wireless data transmission.

3. The method according to claim 1, wherein
   an orientation of the output appliance is detected and evaluated, and
   the detected orientation is taken as a basis for generating a start signal that stimulates the vision or another sense of the driver.

4. The method according to claim 1, wherein
   presence of the stop signal prompts further data to be captured and evaluated in order to determine a confidence value for the reference, and
   generating a confirmation signal if the result of a comparison is that the confidence value is greater than a predetermined threshold value.

5. The method according to claim 1, wherein
   a further start signal is generated if starting of the motor vehicle has not been detected after a period of time has elapsed.

6. The method according to claim 1, wherein
   the motor vehicle is detected as being at a standstill on the basis of motor vehicle operating parameters.

7. An apparatus for reminding a driver of a motor vehicle to start at a light signal device, comprising:
   a computer apparatus configured to execute processing to:
      detect light signals of a light signal device,
      generate a stop signal when a stop light signal is detected while the motor vehicle is at a standstill,
      when the stop signal is present, generate a start signal when the light signal is detected as changing over to a drive light signal, wherein
         presence of the stop signal prompts further data to be captured and evaluated to determine a confidence value for reference,
      transmit the start signal to an output appliance via an interface, and
         generate a confirmation signal if the result of a comparison is that the confidence value is greater than a predetermined threshold value.

8. A motor vehicle comprising an apparatus according to claim 7.

9. A computer product comprising a non-transitory computer readable medium having stored thereon program code that, when executed, cause a processor of a motor vehicle to:
   detect light signals of a light signal device,
   generate a stop signal when a stop light signal is detected while the motor vehicle is at a standstill,
   when the stop signal is present, generate a start signal when the light signal is detected as changing over to a drive light signal,
   transmit the start signal to an output appliance via an interface, wherein an orientation of the output appliance is detected and evaluated, and the detected orientation is taken as a basis for generating the start signal that stimulates the vision or another sense of the driver.

10. The method of claim 1, wherein
the line of vision of the driver is detected by an interior camera of the motor vehicle.

11. The method of claim 5, further comprising:
adjusting the period of time in response to detecting how quickly a vehicle in front starts moving in response to the drive light signal.

12. The method of claim 5, further comprising:
adjusting the period of time in response to determining a number of road users situated in an area surrounding the motor vehicle.

13. The method of claim 5, wherein
the start signal and further start signal are each output using at least one of a visual, audible, or haptic output types, and
the start signal is output using a different output type than the further start signal output type.

14. The apparatus of claim 7, wherein the computer apparatus is further configured to execute processing to:
adjust the confidence value based on detecting whether the driver has operated the direction of travel indicator.

* * * * *